(12) United States Patent
Igarashi et al.

(10) Patent No.: US 7,697,457 B2
(45) Date of Patent: Apr. 13, 2010

(54) WIRELESS COMMUNICATION APPARATUS AND WIRELESS COMMUNICATION METHOD

(75) Inventors: Kei Igarashi, Yokosuka (JP); Akira Yamada, Yokohama (JP); Atsushi Fujiwara, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 614 days.

(21) Appl. No.: 11/522,414

(22) Filed: Sep. 18, 2006

(65) Prior Publication Data

US 2007/0086471 A1  Apr. 19, 2007

(30) Foreign Application Priority Data

Sep. 29, 2005  (JP) ............................. 2005-285024

(51) Int. Cl.
*H04L 12/28* (2006.01)
(52) U.S. Cl. .................... 370/254; 370/311; 370/395.4; 370/512
(58) Field of Classification Search ................. 370/412
See application file for complete search history.

(56) References Cited

U.S. PATENT DOCUMENTS

| 6,018,642 | A | 1/2000 | Adachi |
| 2004/0042434 | A1 | 3/2004 | Kennedy |
| 2005/0003794 | A1* | 1/2005 | Liu ............................. 455/355 |
| 2005/0068934 | A1 | 3/2005 | Sakoda |
| 2005/0085279 | A1 | 4/2005 | Aoki |
| 2005/0243782 | A1* | 11/2005 | Sakoda et al. ............... 370/338 |
| 2005/0250469 | A1* | 11/2005 | Laroia et al. ................. 455/403 |
| 2006/0165031 | A1* | 7/2006 | Wang et al. .................. 370/328 |
| 2007/0060141 | A1* | 3/2007 | Kangude et al. ............. 455/445 |

FOREIGN PATENT DOCUMENTS

| JP | 5-183487 | 7/1993 |
| JP | 2004-234667 | 8/2004 |
| JP | 2004-336401 | 11/2004 |
| JP | 2005-57602 | 3/2005 |
| WO | WO 01/92992 A2 | 12/2001 |

OTHER PUBLICATIONS

ANSI/IEEE std 802.11, Wireless LAN medium access control (MAC) and physical layer (PHY) specifications, 1999, pp. IV-XVI, 1-512.
Jing Al, et al., "An Adaptive Coordinated Medium Access Control for Wireless Sensor Networks", Computers and Communications, 2004, vol. 1, XP010741922, ISBN: 978-0-7803-8623-5, Jun. 28, 2004, pp. 214-219.

* cited by examiner

*Primary Examiner*—Chirag G Shah
*Assistant Examiner*—Daniel Mitchell
(74) *Attorney, Agent, or Firm*—Oblon, Spivak, McClelland, Maier & Neustadt, L.L.P.

(57) ABSTRACT

A wireless communication apparatus comprises a transmission buffer configured to store packets addressed to one or more communication nodes in the network until a transmission timing; a requesting interval determination unit configured to determine a listen interval for each of the communication nodes based on the amount and/or the priority of packets accumulated in the transmission buffer; and a transmission unit configured to transmit a request frame to each of the communication nodes to request the communication nodes to receive a beacon from the wireless communication apparatus at the determined listen interval.

11 Claims, 12 Drawing Sheets

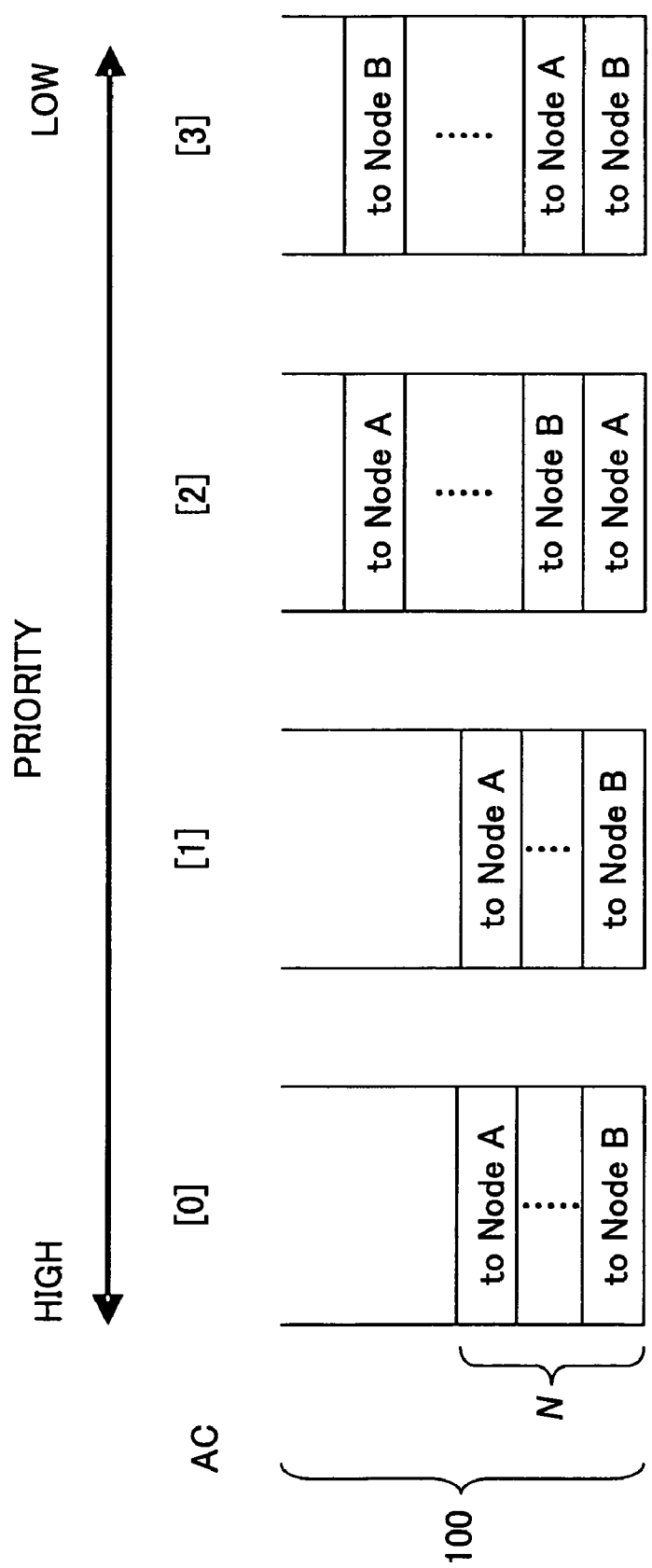

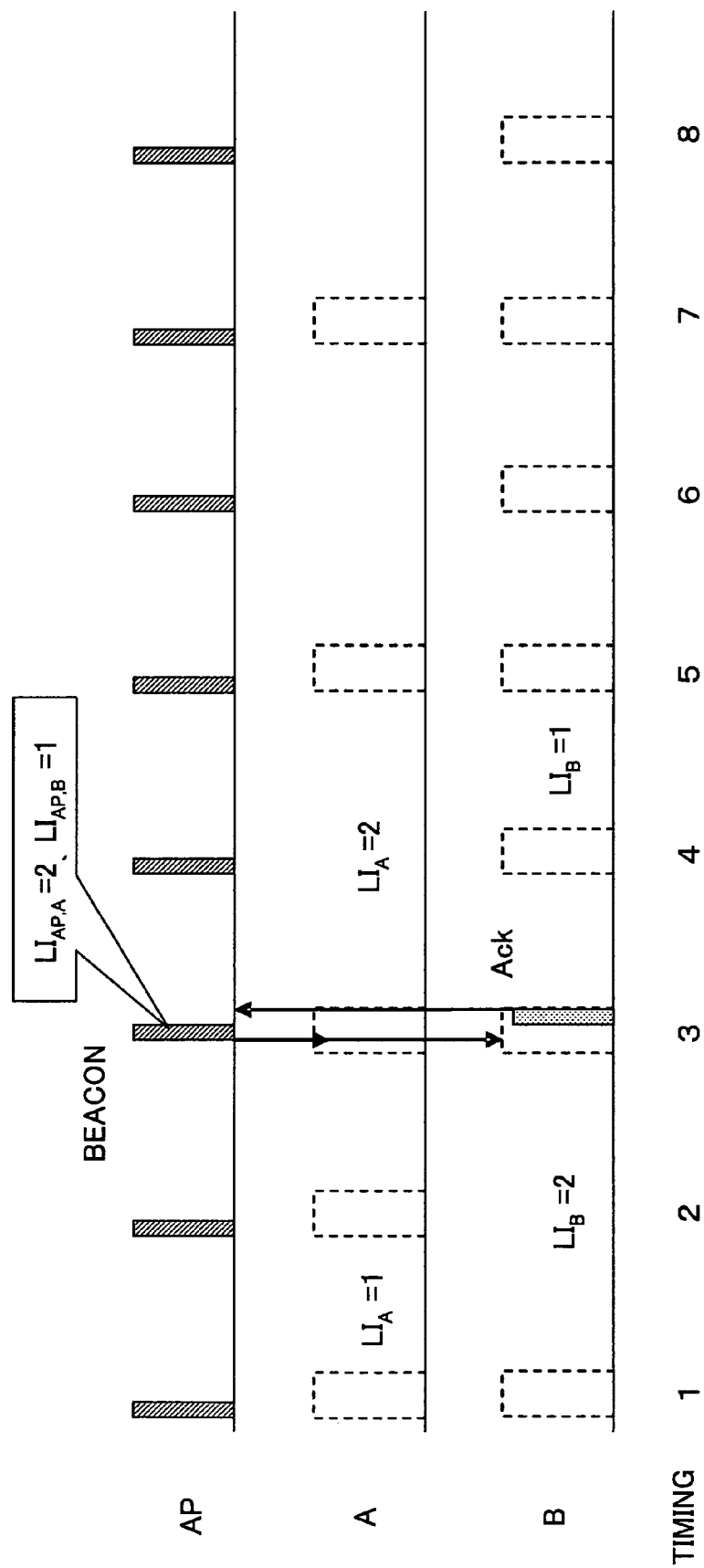

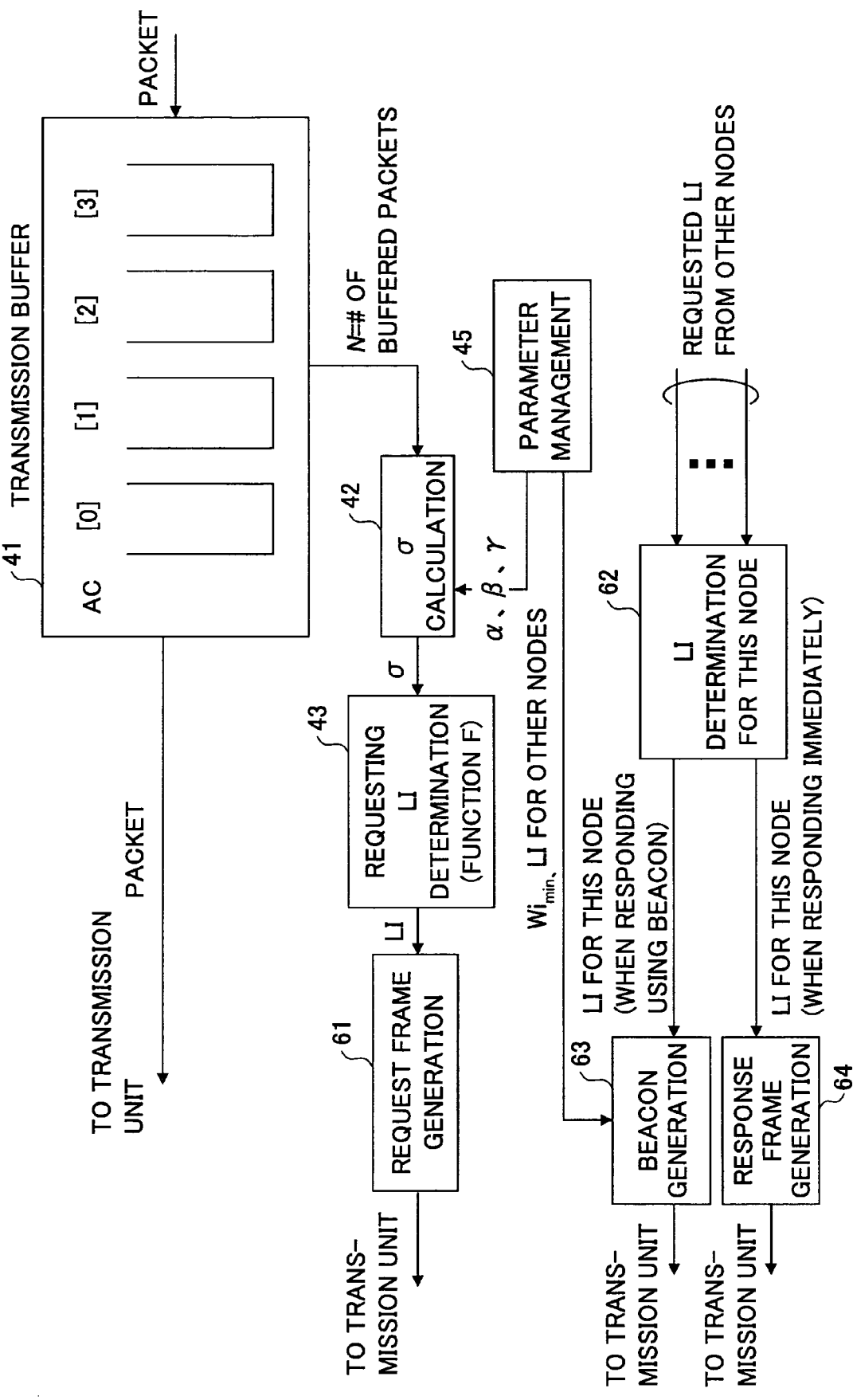

WIRELESS COMMUNICATION APPARATUS AND WIRELESS COMMUNICATION METHOD

FIELD OF THE INVENTION

The present invention generally relates to a wireless communication technique, and more particularly to an apparatus and a method employed in a wireless communication system that allows mobile stations to communicate with each other with or without a base station or an access point between them.

BACKGROUND OF THE INVENTION

FIG. 1 illustrates an example of a wireless infrastructure consisting of an access point (or a base station) and mobile stations communicating with each other via the access point. A power saving technique is applied to the mobile stations connected to the access point via wireless channels in order to reduce power consumption when they do not actually transmit and/or receive user data or traffic data. This type of wireless network structured by an access point (base station) and mobile stations connected to the access point via wireless channels is called a wireless infrastructure. In a wireless infrastructure, data transmission is performed directly between the base station and a mobile station, while data transmission between mobile stations 1 and 2 is performed via the access point.

In the wireless infrastructure (BSS) defined by IEEE 802.11, an access point or a base station transmits a common indication (beacon) at a prescribed frequency to mobile stations located under this access point. A beacon signal contains a variety of information items, including information about existence or non-existence of data packets for mobile stations operating in the power-saving mode in the transmission buffer of the access point, as well as identifications of the mobile stations located under the access point and the information about the base time. The information representing the existence or non-existence of the packets is called a traffic indication message (TIM). In the power-saving mode, a mobile station wakes up periodically according to the listen interval to receive the beacon signal. The state in which the mobile station is dormant and not receiving signals is called "Doze". The state in which the mobile station is awake to receive the beacon signal is called "Awake". The listen interval is a parameter for defining the beacon receiving frequency. The mobile station analyzes the TIM contained in the beacon to determine whether data for that mobile station are buffered in the base station. If there are data addressed to this mobile station in the access point, the mobile station transmits a control frame named a power saving poll (PS-poll) to the access point. In response to the PS-poll, the access point transmits data to the mobile station. Upon transmission of the PS-poll, the mobile station keeps "Awake" until the buffered data are received completely. If there are no data for this mobile station accumulated in the access point, the mobile station returns to the "Doze" state immediately. In this manner, the wireless mobile station in the power-wave mode repeats "Awake" and "Doze" at a prescribed cycle.

FIG. 2 illustrates a wireless communication system in which mobile stations relay data toward the destination without an access point (base station). This type of network is called an ad-hoc wireless network. The power-saving technique of intermittent reception may also be applied to the ad-hoc wireless network. In the ad-hoc wireless network, data transmission is performed directly between mobile stations (MS1-MS2, MS2-MS3, and MS3-MS4 in FIG. 2) located within the communication range, while indirect data transmission is performed between mobile stations that cannot directly reach each other (MS1-MS4, MS1-MS3, and MS2-MS4 in FIG. 2), via other mobile stations. The ad-hoc wireless network may be structured solely by wireless LAN equipment, such as notebook computers or cellular phones, as illustrated in FIG. 2, or it may be structured as an ad-hoc mesh network, as illustrated in FIG. 3, which network includes wireless LAN access points and wireless LAN equipment.

In an ad-hoc wireless network (IBSS) defined by IEEE 802.11, a signal named an announcement traffic indication message (ATIM) is transmitted to neighboring nodes operating in the power-saving mode to inform the nearby nodes that frames are to be transmitted in a while. The ATIM is transmitted in a specific time period starting from the beacon transmission time (which time period is called an ATIM window). The ATIM window only allows transmission of a beacon or an ATIM, and it requires the mobile stations to be in the "Awake" state. A node that receives an ATIM in the ATIM window maintains the "Awake" state until the frames are received, and a node that does not receive the ATIM returns to the "Doze" state. A node operating in the power-saving mode repeats the "Awake" state and the "Doze" state at a prescribed cycle.

Conventional wireless infrastructures and conventional ad-hoc wireless networks are described in publications listed below.

Patent-Related Publication 1: JP H5-183487A
Patent-Related Publication 2: JP 2005-57602A
Patent-Related Publication 3: JP 2004-234667A
Patent-Related Publication 4: JP 2004-336401A
Non-patent Publication 1: ANSI/IEEE std 802.11, Wireless LAN medium access control (MAC) and physical layer (PHY) specifications, 1999

Patent-related publication 1 discloses a technique for controlling the interval of intermittent reception in a wireless infrastructure. In this publication, a mobile station changes the listen interval or intermittent reception interval (i.e., the switching cycle between the awake state and the doze state) from the viewpoint of the frequency of sending and receiving messages, and reports the change of interval to the base station. In patent-related publication 2, a mobile station changes the intermittent reception interval by means of activated application software in a wireless infrastructure. Patent-related publication 3-discloses a method for controlling the power condition of the network interface module of a mobile station based on the information supplied from other modules. Patent-related publication 4 discloses a technique for saving power of an access point in a wireless infrastructure. In this publication, the access points shifts to the "Doze" state taking the traffic condition into account. Non-patent publication 1 describes that it is possible for a mobile station to change the interval of intermittent reception in a wireless infrastructure.

With the conventional BSS, however, there is a problem in that the listen interval for intermittent reception is determined by a mobile station without considering the traffic conditions at the access point. If the listen interval set for intermittent reception at the mobile station is unnecessarily short, the mobile station wakes up too often even if no signal is to be transmitted from the access point. If the listen interval is set too long, packet transmission (reception) delay increases and the throughput may fall.

In the conventional IBSS, mobile stations (wireless nodes) in the network repeat "Awake" and "Doze" all at once at a prescribed cycle. Similar to the BSS structure, if mobile stations shift to the "Awake" state too frequently even if no signal transmission/reception is scheduled, power consumption increases unnecessarily. If the listen interval is too long, delay in packet transmission/reception increases and the throughput is reduced. These problems are likely to arise in both directions between mobile stations because there is no uplink/downlink distinction in IBSS, unlike BSS.

Although the above-listed patent-related publications and non-patent publication disclose techniques for changing the listen interval for intermittent reception, no publication proposes to set the listen interval for intermittent reception based upon actual traffic conditions. Therefore, the above-described problems are left without solutions.

SUMMARY OF THE INVENTION

Therefore, the preferred embodiment of the invention may provide a wireless communication technique for appropriately adjusting the listen interval or intermittent reception when communication nodes are operating in the power-saving mode. In this specification and claims, "listen interval" or "intermittent reception interval" means a switching cycle between the awake state and the doze state.

In one aspect of the invention, a wireless communication apparatus is provided to realize the appropriate control on the listen interval for intermittent reception (referred to as "intermittent reception interval") in the power-saving mode. The wireless communication apparatus includes:

(a) a transmission buffer configured to store packets addressed to one or more communication nodes until transmission timing;

(b) a determination unit configured to determine the intermittent reception interval for each of the communication nodes based upon the amount and/or priority of packets accumulated in the transmission buffer; and (c) a requesting unit configured to request each of the communication nodes to receive a beacon at the determined intermittent reception interval.

With this arrangement, the intermittent reception interval in the power-saving mode is appropriately determined according to the buffering condition of the transmission buffer, and accordingly, the power-saving effect can be improved in the awake state of the communication node. In addition, because the actual buffer condition or the amount of accumulated packets is taken into account for each of the links, the communication node does not have to wake up too frequently. This is advantageous especially for preventing a delay in the transmission of real-time application packets.

In a preferred example, a relative priority (preferential) level may be calculated for each of the nodes to which the packet is to be transmitted, based on the amount of packets accumulated in each of the access categories.

The calculated relative priority level may be converted to a parameter (interval factor) that defines a listen interval using an appropriate function. The interval factor may be expressed by a power of 2. Because the beacon transmission interval is generally determined from the least common multiple of the interval factors, using power of 2 is advantageous in setting the beacon transmission interval as short as possible.

In a preferred example, when the intermittent reception interval is changed to be shorter, such a change is reported immediately to the access point or the other nodes. This arrangement can prevent a long transmission delay for high-priority packets. When the intermittent reception interval is extended, a response may be made by a beacon at the next beacon transmission timing in response to an interval change request.

The present invention may be applied not only to a wireless network of an infrastructure mode, but also to a wireless ad-hoc or mesh network, and it is also widely applicable to a communication node that transmits a beacon. For example, the invention is applied to wireless LAN devices in an ad-hoc wireless network, and to wireless LAN access points in a mesh network.

BRIEF DESCRIPTION OF THE DRAWINGS

Other features and advantages of the invention will become more apparent from the following detailed description when read in conjunction with the accompanying drawings, in which

FIG. 4C is a schematic diagram illustrating the queues in the transmission buffer;

FIG. 5 is a schematic diagram illustrating an example of operating timing according to an embodiment of the invention;

FIG. 6B is a functional block diagram of a mobile station according to the second embodiment of the invention;

DETAILED DESCRIPTION OF THE PREFERRED EMBODIMENT

The preferred embodiments of the invention are described below in conjunction with the attached figures. In the embodiments, both an ad-hoc network and a mesh network are referred to a "ad-hoc wireless network". A wireless LAN access point (base station) and a wireless LAN device may be called a "node". The present invention is applied to a wireless infrastructure in the first embodiment, and to a wireless ad-hoc network in the second embodiment.

Figure 1:
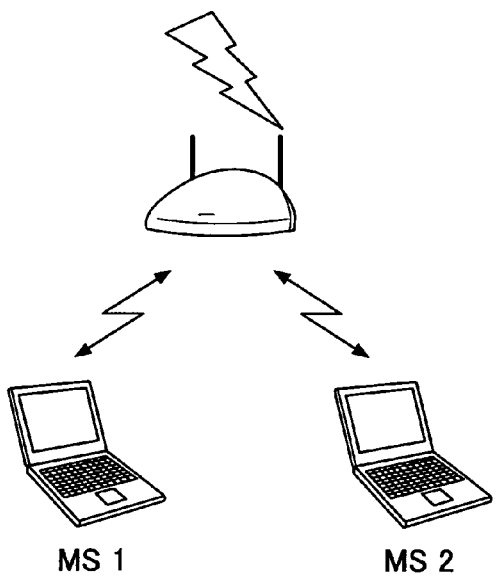
FIG. 1 illustrates an example of a typical wireless infrastructure.
Figure 2:
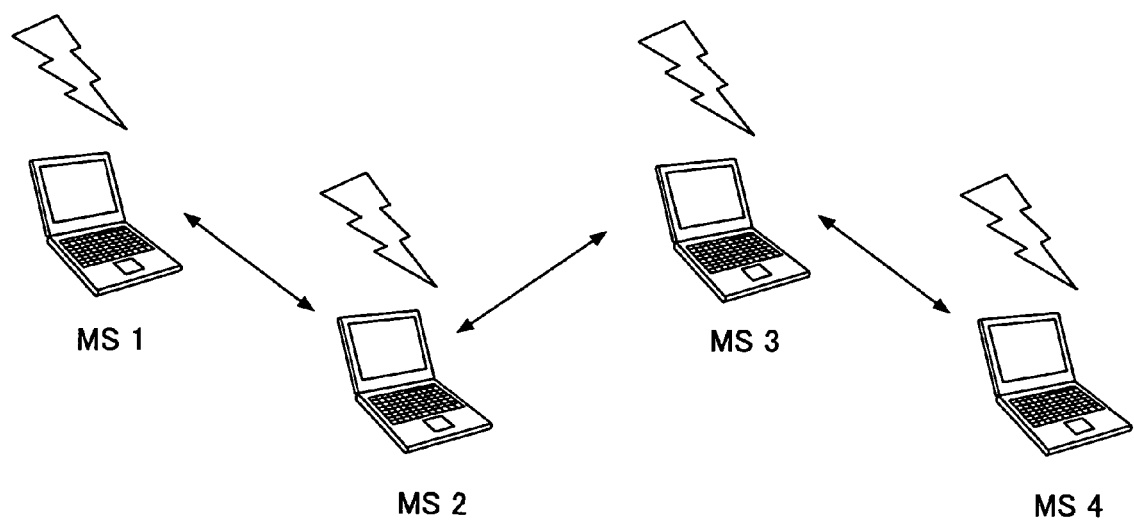
FIG. 2 illustrates an example of an ad-hoc wireless network.
Figure 3:
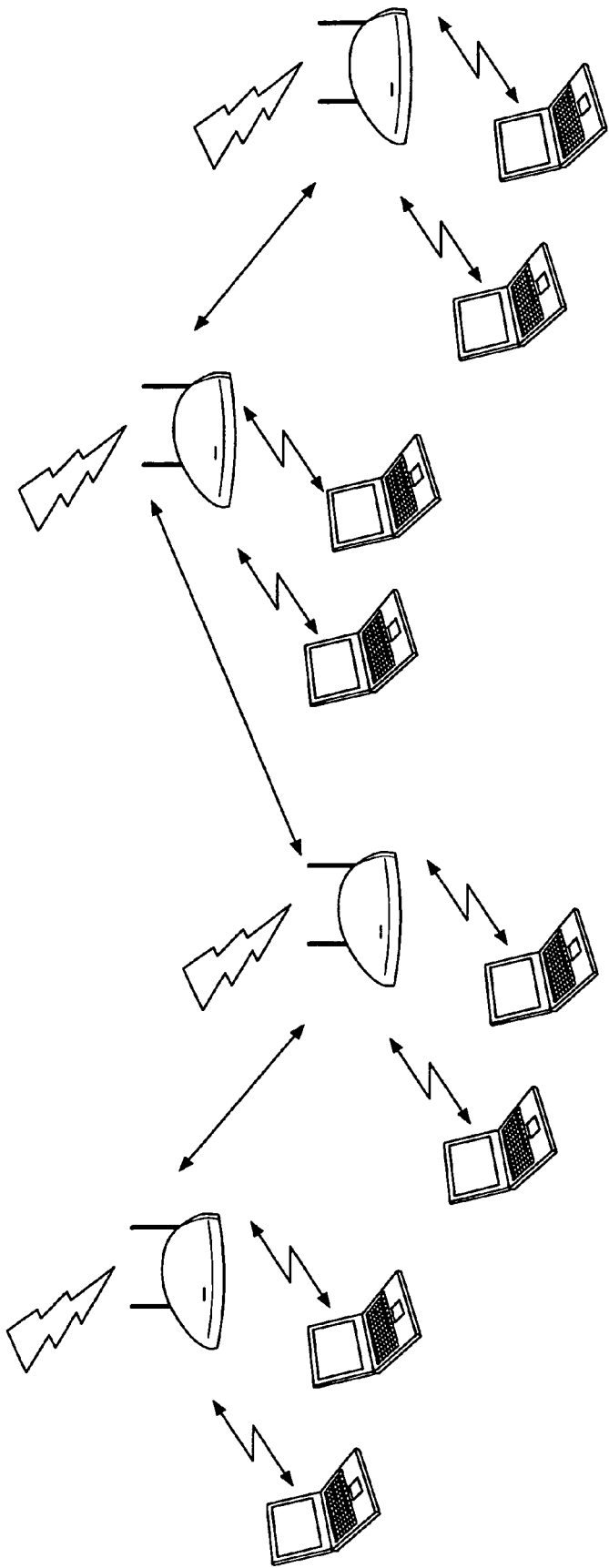
FIG. 3 illustrates an example of a mesh network.
Figure 4A:
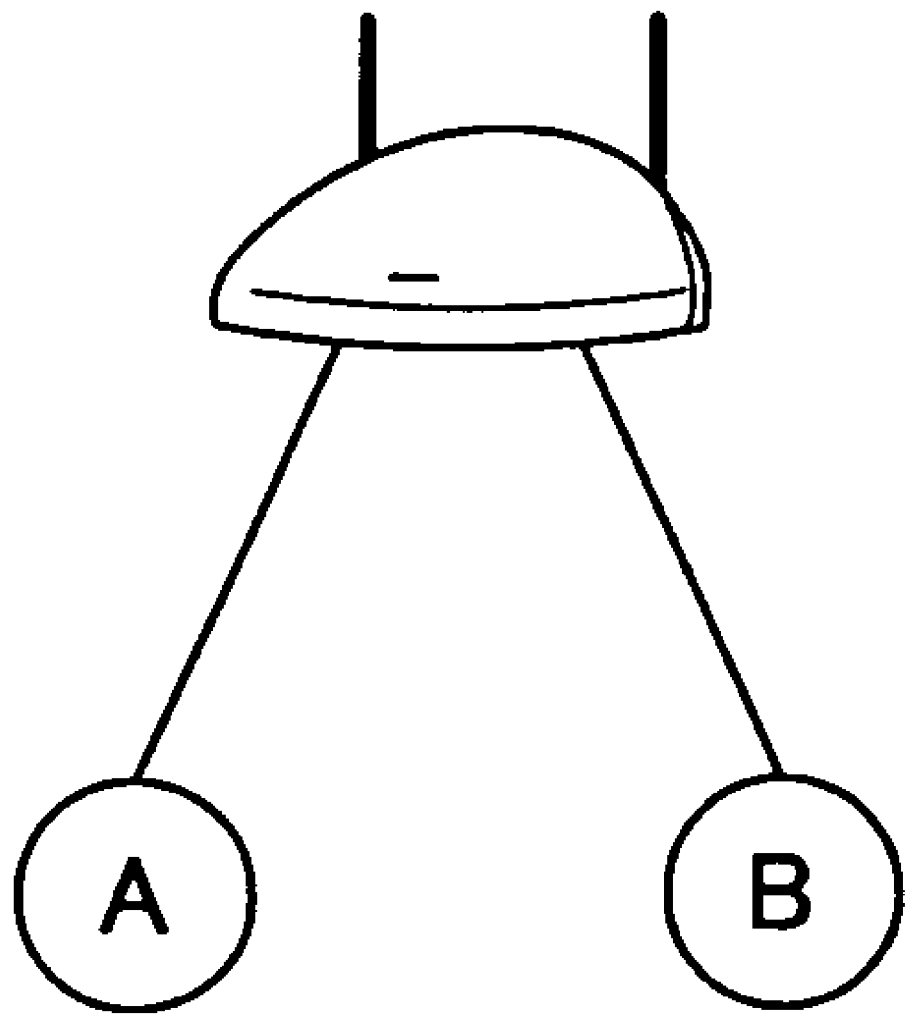
FIG. 4A illustrates a wireless infrastructure according to the first embodiment of the invention.

FIG. 4A is a schematic diagram of a wireless infrastructure according to the first embodiment. Although only two mobile stations A and B are depicted under the access point for the sake of convenience, three or more mobile stations may be located under the access point. The access point serving as a wireless base station and the mobile stations A and B structure a wireless infrastructure (basic service set) defined by, for example, IEEE 802.11. Direct data transmission is performed between the access point and each of the mobile stations, and data transmission between the mobile stations 1 and 2 is indirectly performed via the access point between them.

The access point transmits a common indication (a beacon) to the mobile stations located in its service area at a prescribed frequency. The beacon may contain various information items, including a traffic indication message (TIM) representing whether data addressed to each of the mobile stations operating in the power-saving mode are accumulated in the transmission buffer of the access point, as well as information about the beacon transmission frequency and information about the base time. The mobile station operating in the power-saving mode wakes up from the doze state at the currently determined listen intervals to receive the beacon. The listen interval (or the interval factor LI) is appropriately determined for each of the mobile stations so as to allow flexible and suitable intermittent reception at each mobile station.

Each of the mobile stations analyzes the TIM contained in the received beacon to determine whether data addressed to that mobile station are accumulated in the access point. If there are data for this mobile station in the access point, the mobile station transmits a control frame called a power save poll (PS-poll) to the access point. In response to the PS-poll, the access point transmits the accumulated data to the mobile station. The mobile station is in the "Awake" state until all the data are received. If there are no data addressed to this mobile station in the access point, the mobile station promptly returns to the "Doze" state. In this manner, the mobile station operating in the power-saving mode repeats "Awake" and "Doze" at a prescribed cycle.

Figure 4B:
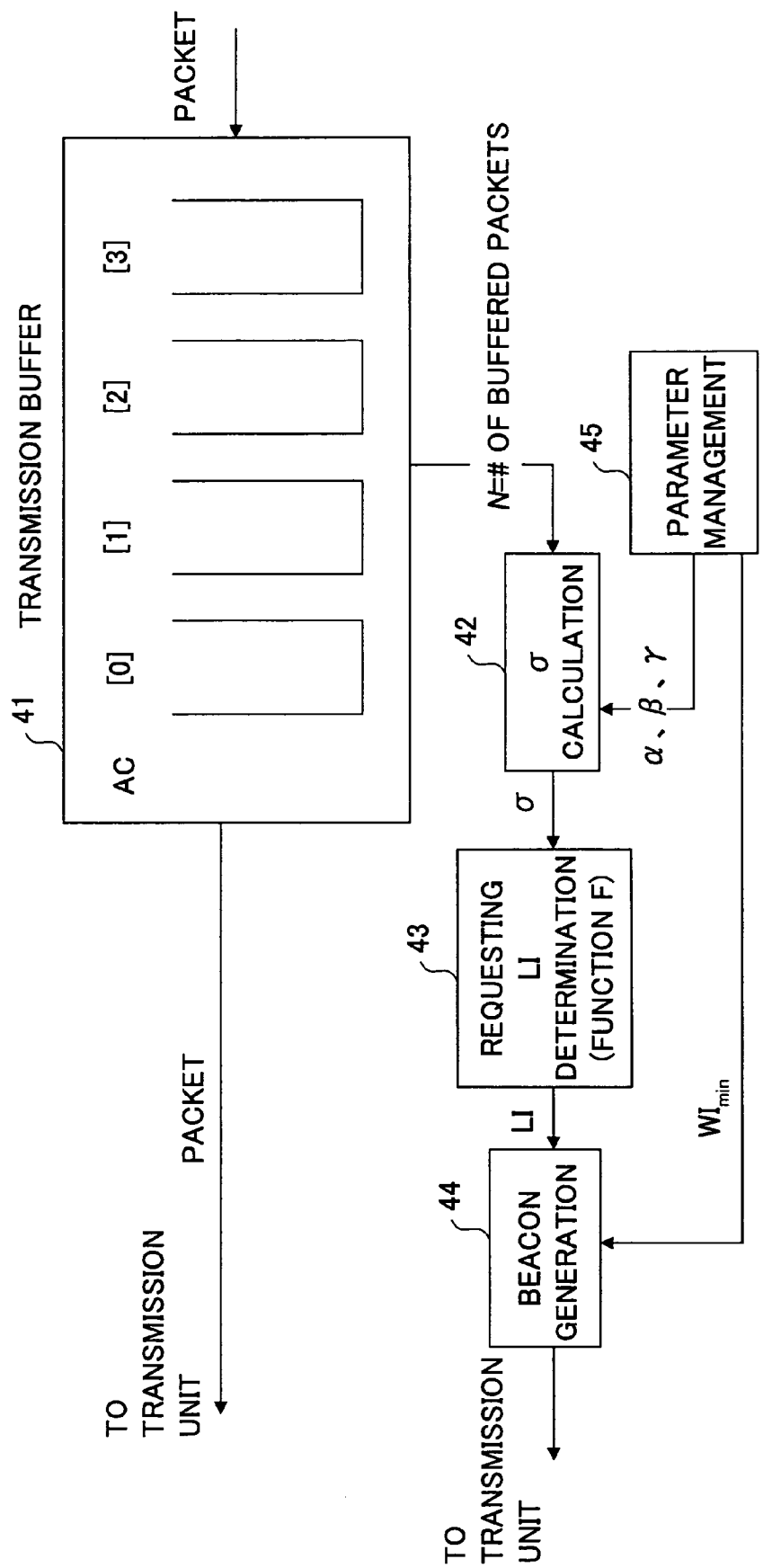
FIG. 4B is a functional block diagram of the access point or the base station according to an embodiment of the invention.

FIG. 4B is a schematic block diagram of the access point (AP), which includes a transmission buffer 41, a priority (σ) calculation unit 42, a requesting listen interval (LI) determination unit 43, a beacon generating unit 44, and a parameter management unit 45.

The transmission buffer 41 stores packets to be relayed to mobile terminals A and B until the transmission timings come. In the first embodiment, the packets are stored according to the access categories AC[i] representing the degrees of priority. In the example shown in FIG. 4B, four access categories AC[0] through AC[3] are provided. More or fewer access categories may be prepared. As illustrated in FIG. 4C, access category AC[0] has the highest priority. It is assumed that the priority decreases toward AC[1], AC[2], and AC[3].

Returning to FIG. 4B, the priority (σ) calculation unit 42 calculates a parameter σ for each of the destinations (mobile stations) from equation (1), based upon the amount of packets accumulated in the transmission buffer 41.

$$\sigma_{AP,k} = \frac{N_{0,AP,k} + \alpha N_{1,AP,k} + \beta N_{2,AP,k} + \gamma N_{3,AP,k}}{S_0 + S_1 + S_2 + S_3} \quad (1)$$

Where $N_{i,AP,k}$ denotes the number of packets categorized in access category AC[i] and addressed to the k-th communication node, $S_i$ denotes the maximum number of packets that can be categorized in access category AC[i], and "i" denotes the parameter representing the degree of priority (or the preferential order) taking values of 0, 1, 2, and 3 in this example. Parameters α, β, and γ are weighting parameters selected so as to satisfy 1>α>β>γ>0. As is clearly shown in equation (1), the parameter σ takes a greater value as the number of high-priority packets increases, and it takes a smaller value as the number of high-priority packets decreases. The value of parameter σ (subscripts omitted for simplification) may be associated with the priority level of the destination node.

The requesting listen interval (LI) determination unit 43 applies a suitable transform function F(σ) to the parameter σ to derive a listen interval (LI) that defines the intermittent reception interval for each of the mobile stations located under the access point. The interval factor LI is expressed as $$LI_{AP,k} = F(\sigma_{AP,k}).$$

Figure 4D:
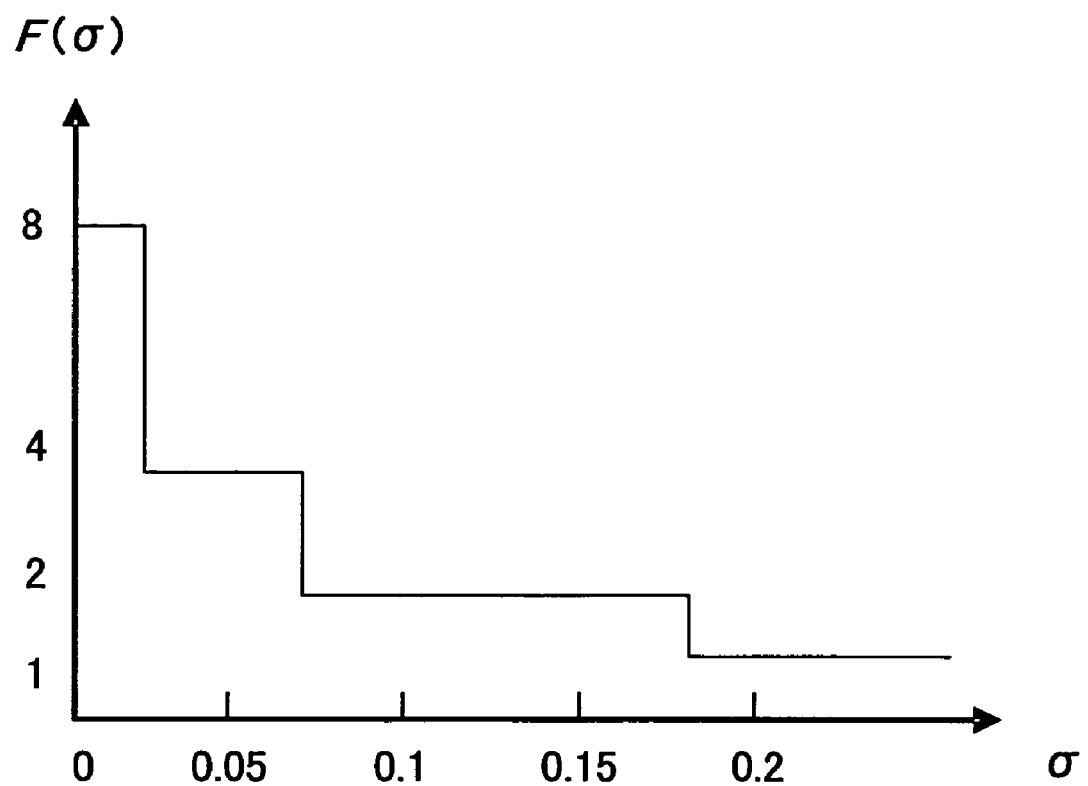
FIG. 4D is a graph illustrating transform function $F(\sigma)$ as a function of parameter $\sigma$ to determine the listen interval (LI)

The transform function F(σ) may be a function illustrated in FIG. 4D. In this example, the interval factor LI approaches 1 as the parameter σ increases (i.e., as the priority level rises), and it takes a greater value as the parameter σ decreases (i.e., as the priority level falls). The interval factor LI is represented by a power of 2 in this example.

Returning again to FIG. 4B, the beacon generating unit 44 generates a beacon which is a periodic indication to the mobile stations located under the access point. The beacon contains information for defining the intermittent reception interval (WI) of each of the mobile stations. This information is typically expressed by LI and $WI_{min}$, the latter representing the minimum interval of the intermittent reception interval defined by the application. For example, the intermittent reception interval $WI_k$ of the k-th communication node is expressed as $$WI_k = LI_{AP,k} \times WI_{min}.$$

As has been described above, the interval factor LI becomes smaller as the priority level is high, and it become greater as the priority level is low. Accordingly, the listen interval becomes shorter for a higher priority level, and becomes longer for a lower priority level.

The parameter management unit 45 manages various parameters including the preference-related parameters α, β, and γ and the minimum intermittent reception interval $WI_{min}$. The minimum $WI_{min}$ of the intermittent reception interval may vary among mobile stations. In this embodiment, a same $WI_{min}$ is used in common among mobile stations for the purpose of simplification; however, in another embodiment, the minimum $WI_{min}$ of the intermittent reception interval may be set smaller for real-time applications in order to make delay requirement stricter. In addition, the parameters α, β, γ, and $WI_{min}$ may be appropriately changed depending on applications.

Figure 4E:
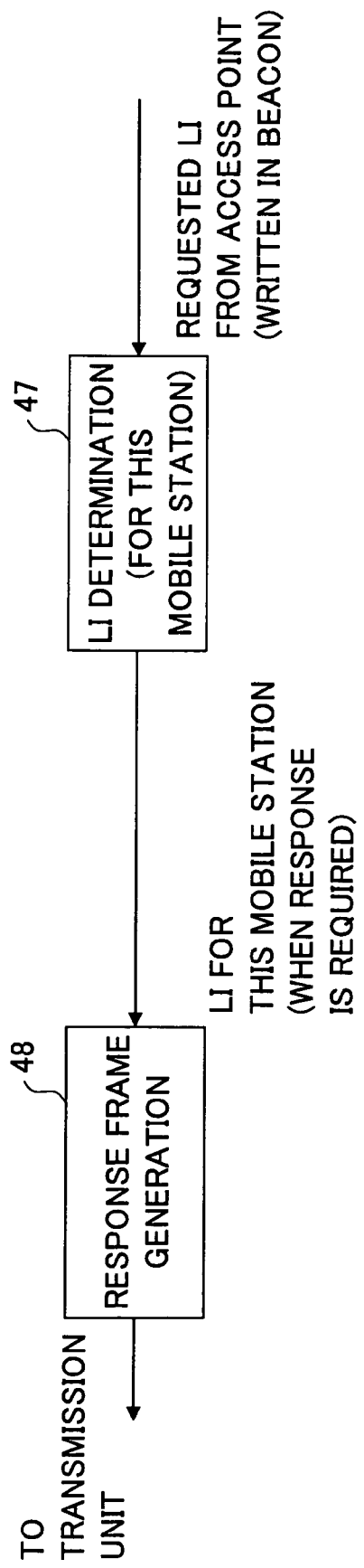
FIG. 4E is a functional block diagram of a mobile station according to an embodiment of the invention

FIG. 4E is a functional block diagram of a mobile station used in the network shown in FIG. 4A. The mobile station includes an LI determination unit 47 for determining a listen interval for this mobile station itself, and a response frame generating unit 48.

The LI determination unit 47 determines the intermittent reception interval (listen interval) for the mobile station itself according to the requested listen interval (which may be represented by $WI_k$ or $LI_{AP,k}$) transmitted from the access point. The LI information requested by the access point is acquired by analyzing the received beacon.

The response frame generating unit 48 generates a response frame to report to the access point that the listen interval (intermittent reception interval) has been appropriately set by the mobile station to the access point. This response operation may be omitted depending on applications.

FIG. 5 is a timing chart used to explain the operations. It is assumed that packet addressed to the mobile stations A and B are accumulated in the queues of the transmission buffer of the access point according to the access categories, as illustrated in FIG. 4C. The queue size Si corresponding to each of the access categories AC[i] is 100 (S0=S1=S2=S3=100). The access point transmits a beacon at interval of 1×$WI_{min}$. The mobile stations A and B are awake in the time slots represented by the dashed block illustrated in FIG. 5, and are dormant in the remaining period.

Before timing 3, mobile station A had been receiving the beacon at listen interval of 1×WI$_{min}$, and mobile station B had been receiving the beacon at listen interval of 2×WI$_{min}$. Then, the condition of the transmission buffer changed and it became necessary to change the listen intervals of the mobile stations. Symbols LI$_A$ and LI$_B$ shown in FIG. 5 denote the interval factors actually measured at the mobile stations A and B, and symbols LI$_{AP,A}$ and LI$_{AP,B}$ denote the interval factors requested by the access point to the mobile stations A and B, respectively.

The access point calculates a parameter σ for the packets addressed to each of the destination mobile stations A and B using equation (1), with parameters α=0.8, β=0.4 and γ=0.2 representing the degrees of priority of the corresponding access categories. Parameter σ$_{AP,A}$ for mobile station A is $$\sigma_{AP,A} = \frac{10 + 0.8 \times 20 + 0.4 \times 30 + 0.2 \times 20}{400} = 0.12. \quad (2)$$

Similarly, parameter σ$_{AP,B}$ for mobile station B is calculated, which parameter is assumed to be 0.25.

Then, the parameters σ are converted to listen intervals LI according to the transform function F(σ) shown in FIG. 4D. In this example,

LI$_{AP,A}$=F(σ$_{AP,A}$)=F(0.12)=2

LI$_{AP,B}$=F(σ$_{AP,B}$)=F(0.25)=1

The calculated values are included in the beacon as information items about the interval factors, and transmitted to the mobile stations A and B at timing 3, as indicated by the downward arrows shown in FIG. 5.

Upon receiving the beacon, mobile station A analyzes the information contained in the beacon, and updates the intermittent reception interval WI$_{AP,k}$. If the minimum interval WI$_{min}$ defined by the application is 20 ms, the mobile station A increases the intermittent reception interval to LI$_{AP,A}$×WI$_{min}$=2×20=40 (ms). The current value of WI$_{min}$ is supplied as the beacon information from the access point to each of the mobile stations A and B. This information may be used at the mobile station to determine the necessity to prolong or shorten the intermittent reception interval. On the other hand, mobile station B reduces the intermittent reception interval to LI$_{AP,B}$×WI$_{min}$=1×20=20 (ms).

Mobile station B returns an Ack frame to the access point when reducing the intermittent reception interval in order to allow the access point to confirm the update of the intermittent reception interval and avoid failure to receive the beacon at the mobile station. If a beacon is transmitted from the access point at a shortened interval before the mobile station has changes its listen interval, the mobile station cannot receive the beacon transmitted during the dormant period. In contrast, when increasing the listen interval, it is unnecessary to return an Ack because the mobile station can receive the beacon transmitted from the access point at an increased interval even if the shorter interval is maintained at the mobile station. (A little bit more power is consumed at most.) Of course, an Ack frame may be transmitted to the access point when the intermittent reception interval is extended. From the viewpoint of reducing unnecessary traffic, it is preferred not to transmit the Ack frame for acknowledging the increase of the listen interval.

Figure 6A:
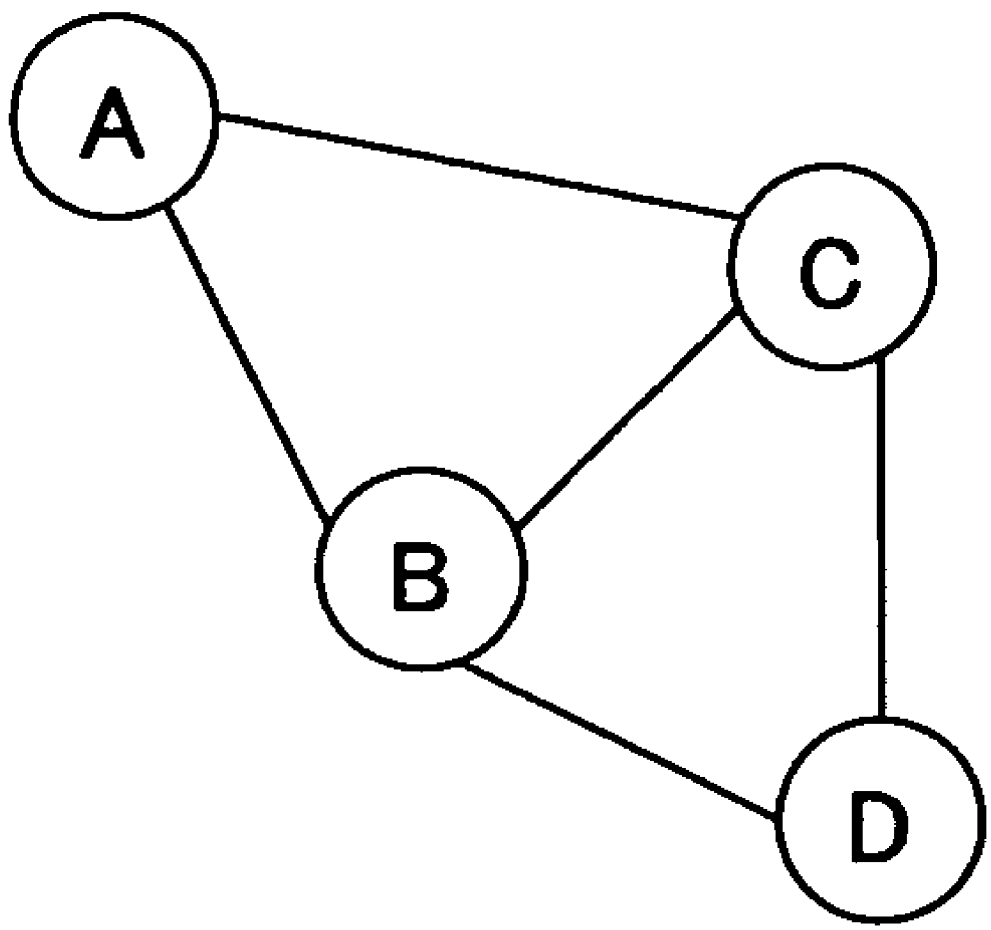
FIG. 6A illustrates an ad-hoc wireless network according to the second embodiment of the invention.

Next, explanation is made of the second embodiment of the invention. FIG. 6A is a schematic diagram illustrating an Ad-hoc wireless network according to the second embodiment. Mobile stations or nodes A, B, C, and D structure an Ad-hoc wireless network. With this network topology, mobile station A communicates directly with mobile stations B and C, but it communicates with mobile station D indirectly via the mobile station B or C. The same applies to mobile station D. Mobile stations B and C can communication directly with all the mobile stations in the network. Mobile stations A, B, C, and D are in sync with each other. When the mobile stations are in the power-saving mode, each of the mobile stations shifts between the awake state and the doze state (dormant) at its own interval. A beacon is transmitted from any one of the mobile stations at a point in time when all the mobile stations are awake.

FIG. 6B is a schematic block diagram of the mobile station according to the second embodiment. The mobile station includes a transmission buffer 41, a priority (σ) calculation unit 42, a requesting listen interval (LI) determination unit 43, and a parameter management unit 45. Since these components are the same as those illustrated in FIG. 4B and described in the first embodiment, overlapped explanation for them is omitted. It should be noted that no access points exist in this network topology, and mobile stations relay data packets to the destination. Accordingly, the parameter σ calculated at mobile station j with respect to mobile station k is calculated by $$\sigma_{j,k} = \frac{N_{0,j,k} + \alpha N_{1,j,k} + \beta N_{2,j,k} + \gamma N_{3,j,k}}{S_0 + S_1 + S_2 + S_3}. \quad (3)$$

The interval factor (listen interval) LI$_{jk}$ requested by mobile station j to mobile station k is LI$_{jk}$=F(σ$_{j,k}$).

The mobile station further includes a request frame generating unit 61, an LI determination unit 62 for determining a listen interval for this mobile station, a beacon generating unit 63, and a response frame generating unit 64.

The request frame generating unit 61 generates a request frame to request another mobile station to perform intermittent reception at the interval derived from the interval factor LI determined by the requesting LI determination unit 43.

The LI determination unit 62 selects an appropriate interval for this mobile station according to interval factors LI$_{j,k}$ requested by the other mobile stations (nodes). For instance, mobile station B selects a suitable listen interval for itself based on the requested interval factors LI transmitted from the mobile stations A, C, and D. If there are two or more options of the interval factors, the smallest one may be selected. The LI determination unit 62 also compares the newly selected interval factor with the currently selected interval factor, and reports the newly selected one to the beacon generating unit 63 or the response frame generating unit 64, depending on the comparison result. If the newly selected interval is longer than the currently selected interval, the new interval factor is reported to the other nodes at the next beacon sending timing. A beacon transmission opportunity is given preferentially to the node that is going to transmit the LI change indication, by reducing the beacon transmission queue time compared with the ordinary transmission timing. If the LI change indication is to be transmitted at the ordinary queue time, the beacon transmission time is taken up by the other nodes, and as a result, transmission of the change indication to the other nodes is delayed. If the newly selected interval factor is smaller than the currently selected one, the new interval factor is reported immediately to the other nodes using a response frame independently from beacon transmission. This operation is described in more detail below.

The beacon generating unit 63 generates a beacon. The beacon is transmitted to the other nodes at a point in time when all the other nodes are awake.

The response frame generating unit 64 generates a response frame independently from a beacon to immediately broadcast the change of the interval factor of this mobile station to the neighboring nodes when the interval factor is reduced. The response frame may contain the updated listen interval or the other information about the interval factor. If these information items are not contained in the response frame, they may be transmitted by a beacon at the next beacon transmission timing. This arrangement is advantageous because the data amount of the response frame can be maintained small and the response frame can be generated and transmitted promptly.

Figure 6C:
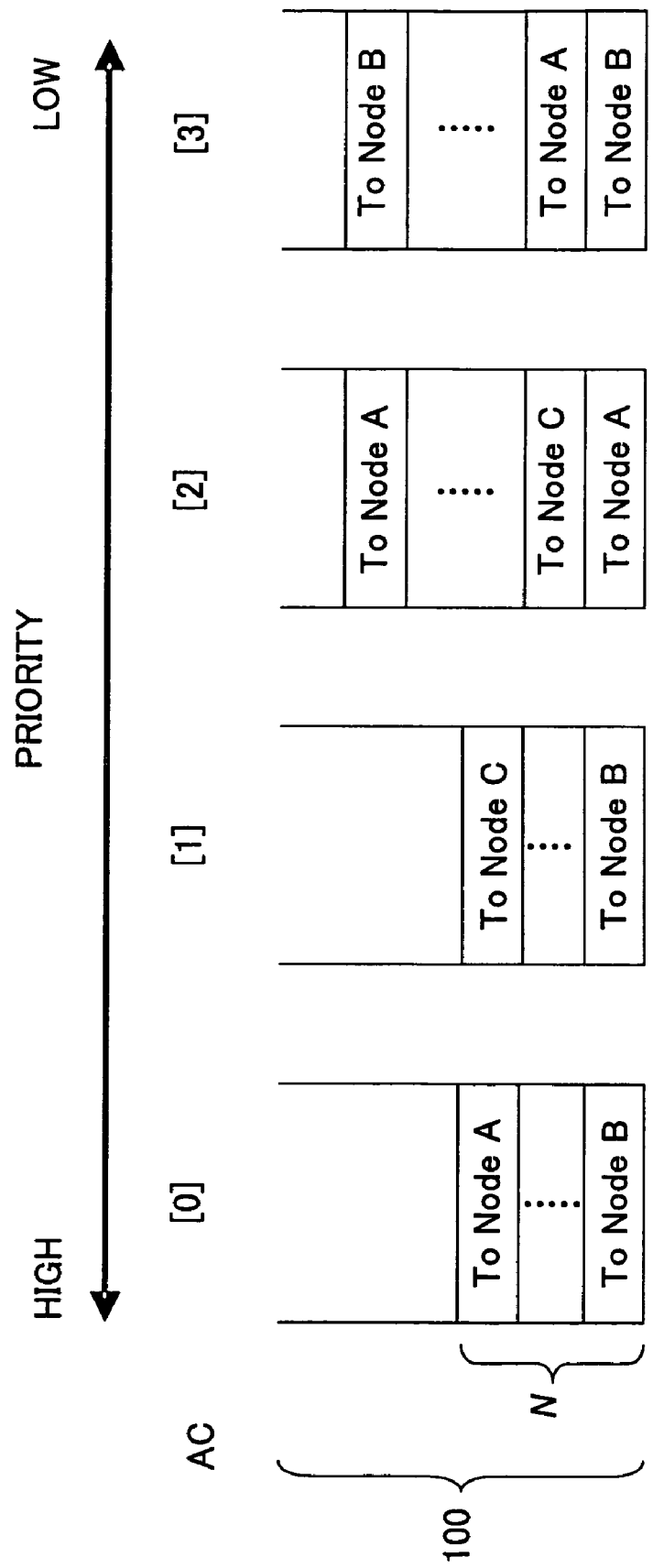
FIG. 6C is a schematic diagram illustrating the queues in the transmission buffer.
Figure 7:
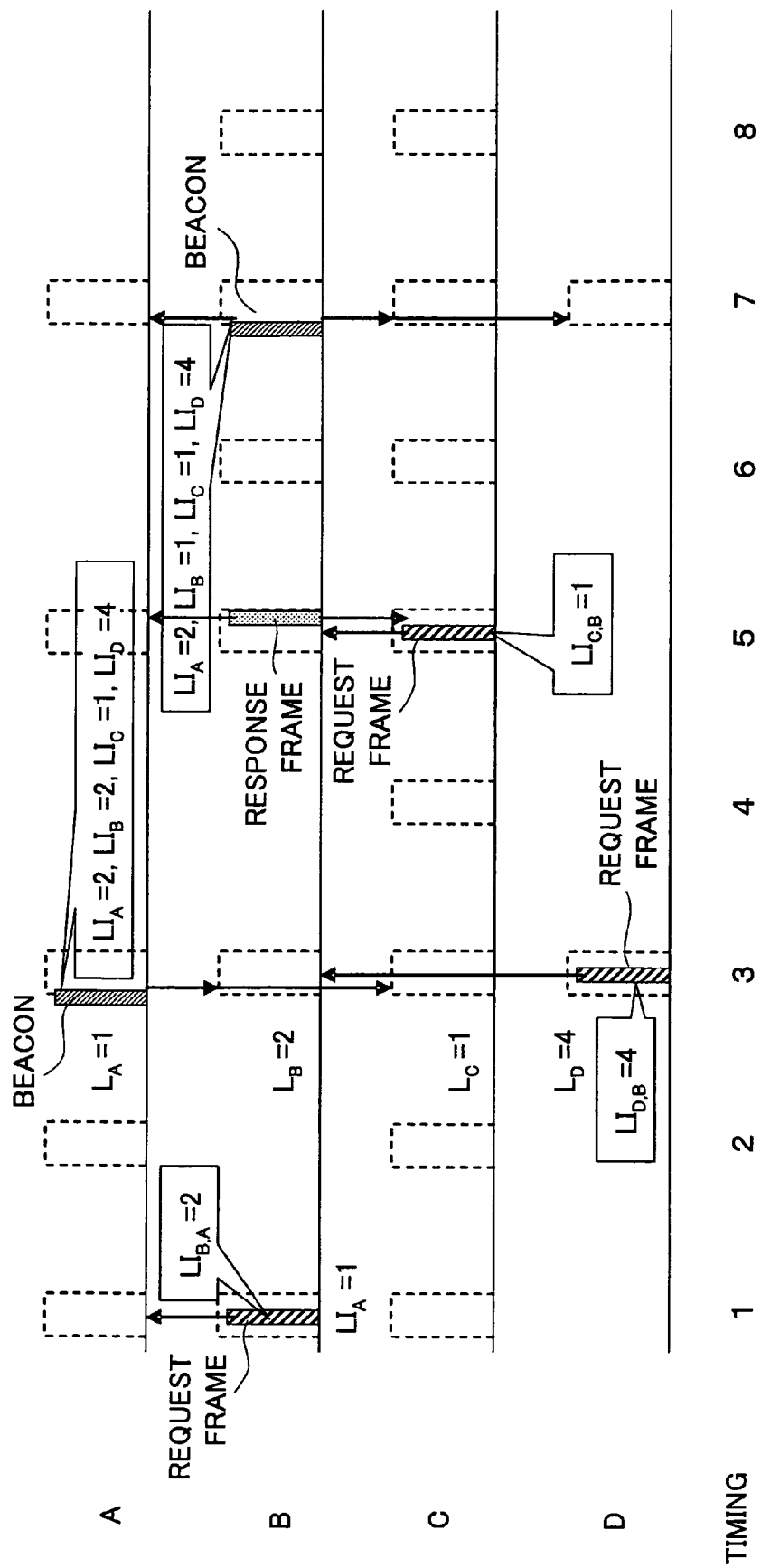
FIG. 7 is a schematic diagram illustrating an example of operating timing according to an embodiment of the invention.

FIG. 7 is a timing chart showing the operations of the ad-hoc wireless network of the second embodiment. It is assumed that packets addressed to the mobile stations A, B, C and D are accumulated in the queues of the transmission buffer of the mobile station B, as illustrated in FIG. 6C, and that the queue size Si corresponding to each of the access categories AC[i] is 100 (S0=S1=S2=S3=100). A beacon is transmitted from any one of the mobile stations at interval of $4 \times WI_{min}$. The beacon is transmitted at timing 3 and 7 in this example at which timing all the mobile stations are awake. Each of the mobile stations A, B, C and D repeats "Doze" and "Awake" at their own intervals. In the initial situation before a change in the buffering condition is detected, the interval factor $LI_A$ of mobile station A is 1, the interval factor $LI_B$ of mobile station B is 2, the interval factor $LI_C$ of mobile station C is 1, and the interval factor $LI_D$ of mobile station D is 4.

The mobile station B calculates a parameter σ for each of the remaining mobile stations. It is assumed that the parameters corresponding to the priority levels of the access categories AC are α=0.8, β=0.4 and γ=0.2, respectively. It is also assumed that the numbers of packets for mobile station A accumulated in the queues of the transmission buffer of mobile station B are AC[0]=10, AC[1]=20, AC[2]=20, and AC[3]=30, respectively. In this case, the parameter $\sigma_{B,A}$ with respect to mobile station A is calculated by $$\sigma_{B,A} = \frac{10 + 0.8 \times 20 + 0.4 \times 20 + 0.2 \times 30}{400} = 0.1. \quad (4)$$

The mobile station B also calculates parameters σ for mobile stations C and D in a similar manner, and determines values 0.2 and 0.05, respectively.

The calculated parameters σ are converted to interval factors (requesting LI) using the transform function shown in FIG. 4D, for example. The acquired interval factors are below.

$LI_{B,A}=F(\sigma_{B,A})=F(0.1)=2$ $LI_{B,C}=F(\sigma_{B,C})=F(0.2)=1$ $LI_{B,D}=F(\sigma_{B,D})=F(0.05)=4$ Comparing these new factors with the initial factors $L_A$=1, $L_B$=2, $L_C$=1, and $L_D$=4, respectively, the requested LI and the current used interval factor are consistent with each other at mobile stations C and D. At mobile station A, the requested LI differs from the currently used interval factor, and therefore, the interval factor has to be updated at mobile station A. Accordingly, mobile station B transmits a request frame to mobile station A at timing 1 to request the mobile station A to increment the interval factor $L_A$ from 1 to 2. In response to the request, mobile station A transmits a beacon reporting the update of the interval factor to the neighboring nodes (B and C) at the next beacon transmission timing (that is, at timing 3). For the mobile station B, this beacon serves as a response frame to the request frame. Concerning the mobile station C, it has to know the update of the interval factor of mobile station A because it is located adjacent to mobile station A in the network topology shown in FIG. 6A.

A beacon is transmitted from any one of the mobile stations when all the mobile stations are awake. In this embodiment, priority is given to a mobile station that has changed the interval factor to transmit a beacon. Upon transmission of the beacon, the mobile station A actually changes the interval factor from 1 to 2. If the minimum interval $WI_{min}$ of intermittent reception defined by the application is 20 ms, the mobile station A changes the intermittent reception interval to 2×20=40 ms.

Then, at timing 5, mobile station C calculated $LI_{C,B}$=1. Since, at this point of time, the interval factor $L_B$ of mobile station B is 2, the interval requested by mobile station C is different from the actual interval. Accordingly, mobile station C transmits a request frame to mobile station B to request the mobile station B to decrement the interval factor from 2 to 1. Upon receiving the request frame, the mobile station B broadcasts a response frame to report the decrement of the interval factor of the mobile station B to the neighboring nodes (mobile stations A and C) before the next beacon transmission timing comes. The interval factor of the mobile station B is actually changed from 2 to 1. This arrangement allows the mobile station C to transmit accumulated packets to mobile station B earlier than the next beacon transmission timing 7. Delay can be effectively prevented especially for those packets requiring real-time transmission. At timing 7, the mobile station B broadcasts a beacon to the neighboring nodes. When a mobile station increases the interval factor, it is desired for that mobile station to shorten the beacon transmission queue time compared with the ordinary queue time so as to allow the beacon to be transmitted promptly.

On the other hand, if mobile station B responds to the request frame transmitted from mobile station C using a beacon, in place of a response frame, at timing 7, the interval factor of the mobile station B is changed from 2 to 1 at or after timing 7. Accordingly, the mobile station C cannot increase the transmission frequency to the mobile station B until timing 7 comes. To avoid such delay, in the second embodiment, a response frame is transmitted immediately at timing 5 in response to the request frame so as to allow mobile station C to increase the transmission frequency to mobile station B promptly. Consequently, transmission delay can be reduced.

If two or more request frames are received during a prescribed period (beacon transmission period in this example), the interval factor that makes the transmission frequency most frequent is selected and the other requests are neglected. For example, mobile station D transmits a request frame of $LI_{D,B}$=4 to mobile station B at timing 3 shown in FIG. 7, and mobile station C transmits a request frame of $LI_{C,B}$=1 to mobile station B at timing 5. In this case, the request from mobile station C defines a more frequent interval factor. Consequently, mobile station B responds to the request from the mobile station C, rather than the request from the mobile station D.

As a result, the beacon transmission interval is 80 ms, and mobile stations A, B, C and D wake up at intervals of 40 ms, 20 ms, 20 ms, and 80 ms, respectively, as illustrated in FIG. 7.

The interval factor LI derived from parameter σ using the function F(σ) is not limited to an integer of power of 2. Since, however, the beacon transmission timing is determined by the least common of multiple interval factors LI, it is desired to select the interval factor from a prescribed set including, for example, regularly incremented numbers 1, 2, 3, . . . , or powers of 2. From the viewpoint of reducing the beacon transmission interval, it is preferred to select the interval factor from the set of integer powers of 2. If the number of options for the interval factor is four, and if the selectable factors are 1, 2, 3 and 4, then the least common becomes 12. In this case, the beacon is transmitted at interval of $12 \times WI_{min}$. In contrast, if interval factor LI is selected from powers of 2 (1, 2, 4 and 8), the least common is 8, and therefore, the beacon is transmitted at interval of $8 \times WI_{min}$. If the number of options is 6, a set of regularly incremented factors (1, 2, 3, 4, 5, 6) leads to the beacon transmission interval of $60 \times WI_{min}$. In contrast, with a set of integer powers of 2 (1, 2, 4, 8, 16, 32), the beacon transmission interval is $32 \times WI_{min}$ at longest. Accordingly, an interval factor of a power of 2 is advantageous to allow mobile stations to change their listen intervals more appropriately according to the actual conditions.

This patent application is based upon and claims the benefit of the earlier filing date of Japanese Patent Application No. 2005-285024 filed Sep. 29, 2005, the entire contents of which are hereby incorporated by reference.

What is claimed is:

1. A wireless communication apparatus comprising: a transmission buffer configured to store packets addressed to one or more communication nodes in the network until a transmission timing;
    a requesting interval determination unit configured to determine a listen interval for each of the communication nodes based on an amount and/or a priority of packets accumulated in the transmission buffer;
    a transmission unit configured to transmit a request frame to each of the communication nodes to request said each of the communication nodes to receive a beacon from the wireless communication apparatus at the determined listen interval; and
    an interval determination unit configured to determine a second listen interval for the wireless communication apparatus itself when a request for changing a currently used listen interval is transmitted from at least one of the communication nodes to the wireless communication apparatus,
    wherein if the determined second listen interval is shorter than the currently used listen interval, the transmission unit transmits a response frame to the request immediately after the reception of the request, independently from the beacon.

2. The wireless communication apparatus of claim 1, wherein the transmission unit transmits the beacon to report the determined listen interval to each of the communication nodes.

3. The wireless communication apparatus of claim 1, wherein the transmission buffer categorizes and stores the packets according to priority levels.

4. The wireless communication apparatus of claim 1, wherein the listen interval is expressed as a product of a reference interval and an interval factor, and the interval factor is determined as a function of the amount of the packets accumulated in the transmission buffer and the priority level of the packets.

5. The wireless communication apparatus of claim 4, wherein the interval factor is expressed as a power of 2.

6. The wireless communication apparatus of claim 1, further comprising: a request frame generating unit configured to generate the request frame for each of the communication nodes independently from the beacon to report the determined listen interval.

7. The wireless communication apparatus of claim 1, wherein if the determined second listen interval is longer than the currently used listen interval, a beacon transmission queue time is reduced and the transmission unit reports the determined second listen interval to at least one of the communication nodes using the beacon.

8. A wireless communication method comprising the steps of:
    storing packets addressed to one or more communication nodes in a transmission buffer;
    determining a listen interval for each of the communication nodes based on an amount and/or a priority of the packets accumulated in the transmission buffer; requesting each of the communication nodes to receive a beacon at the determined listen interval, and
    determining a second listen interval for a wireless communication apparatus itself when a request for changing a currently used listen interval is transmitted from at least one of the communication nodes to the wireless communication apparatus,
    wherein if the determined second listen interval is shorter than the currently used listen interval, transmitting by a transmitting unit, a response frame to the request immediately after the reception of the request, independently from the beacon.

9. The wireless communication apparatus of claim 1, wherein the requesting interval determination unit selects an appropriate listen interval according to interval factors requested by other communication nodes in the network.

10. The wireless communication apparatus of claim 4, wherein a communication node selects a suitable listen interval for itself based on requested interval factors transmitted from other communication nodes.

11. The wireless communication apparatus of claim 1, wherein when the priority level for a communication node becomes lower the listen interval become greater.

* * * * *